US012608184B1

(12) United States Patent
Sandanagobalane et al.

(10) Patent No.: US 12,608,184 B1
(45) Date of Patent: Apr. 21, 2026

(54) CODE COVERAGE GENERATION THROUGH HOST-DEVICE COORDINATION

(71) Applicant: Nvidia Corporation, Santa Clara, CA (US)

(72) Inventors: Hari Sandanagobalane, Kirkland, WA (US); Sean Youngsung Lee, Kirkland, WA (US); Vinod Grover, Mercer Island, WA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 17/024,139

(22) Filed: Sep. 17, 2020

Related U.S. Application Data

(63) Continuation of application No. 16/154,542, filed on Oct. 8, 2018, now abandoned.
(Continued)

(51) Int. Cl.
*G06F 8/41* (2018.01)
*G06F 9/445* (2018.01)
(Continued)

(52) U.S. Cl.
CPC .............. *G06F 8/4441* (2013.01); *G06F 8/41* (2013.01); *G06F 8/451* (2013.01); *G06F 8/458* (2013.01); *G06F 11/3624* (2013.01); *G06F 11/3676* (2013.01); *G06F 16/9024* (2019.01); *G06F 16/9027* (2019.01); *G06F 16/90335* (2019.01); *G06F 8/443* (2013.01); *G06F 9/44547* (2013.01)

(58) Field of Classification Search
CPC ............. G06F 8/4441; G06F 16/90335; G06F 16/9027; G06F 16/9024; G06F 8/41; G06F 8/451; G06F 8/458; G06F 11/3624; G06F 11/3676; G06F 8/443; G06F 9/44547
See application file for complete search history.

(56) References Cited

U.S. PATENT DOCUMENTS

| | | |
|---|---|---|
| 5,758,061 A | 5/1998 | Plum |
| 5,815,720 A | 9/1998 | Buzbee |

(Continued)

OTHER PUBLICATIONS

Braak et al., "Compile-time GPU Memory Access Optimizations" (Year: 2010).*

(Continued)

*Primary Examiner* — Phillip H Nguyen
(74) *Attorney, Agent, or Firm* — Davis Wright Tremaine LLP

(57) ABSTRACT

System and method of compiling a program having a mixture of host code and device code to enable code coverage data collection for device code execution. An exemplary integrated compiler can compile source code programmed to be executed by a host processor (e.g., CPU) and a co-processor (e.g., a GPU) concurrently. The compilation can generate an instrumented executable code which includes: coverage instrumentation counters for the device functions; mapping information that maps the counters with the instrumented source points; and instructions for the host processor to allocate and initialize device memory for the counters and to retrieve collected code coverage information from the device memory to the host memory. Execution of the instrumented executable can yield a coverage report on the device code functions.

25 Claims, 5 Drawing Sheets

250

Related U.S. Application Data

(60) Provisional application No. 62/569,380, filed on Oct. 6, 2017.

(51) Int. Cl.
| | |
|---|---|
| *G06F 11/362* | (2025.01) |
| *G06F 11/3668* | (2025.01) |
| *G06F 16/901* | (2019.01) |
| *G06F 16/903* | (2019.01) |

(56) References Cited

U.S. PATENT DOCUMENTS

| | | | |
|---|---|---|---|
| 5,909,577 A * | 6/1999 | Devanbu | G06F 11/3624 717/127 |
| 6,219,825 B1 * | 4/2001 | Burch | G06F 8/4442 717/158 |
| 6,631,518 B1 | 10/2003 | Bortnikov | |
| 6,795,963 B1 | 9/2004 | Andersen | |
| 7,730,469 B1 | 6/2010 | Boucher | |
| 7,954,094 B2 | 5/2011 | Cascaval | |
| 8,522,215 B1 * | 8/2013 | Aldrich | G06F 9/44589 717/126 |
| 8,819,649 B2 | 8/2014 | Lafreniere | |
| 9,262,166 B2 | 2/2016 | Kang | |
| 9,274,771 B1 | 3/2016 | Kalgeropulos | |
| 9,348,567 B2 | 5/2016 | Sharma | |
| 9,612,809 B2 | 4/2017 | Mahffey | |
| 9,760,351 B2 | 9/2017 | Johnson | |
| 10,132,862 B1 * | 11/2018 | Agarwal | G06F 30/331 |
| 10,713,069 B2 * | 7/2020 | Boshernitsan | G06F 11/3676 |
| 2001/0037450 A1 * | 11/2001 | Metlitski | G06F 21/72 711/E12.092 |
| 2001/0047510 A1 * | 11/2001 | Angel | G06F 8/41 714/E11.209 |
| 2003/0066060 A1 | 4/2003 | Ford | |
| 2005/0028148 A1 | 2/2005 | Quick | |
| 2006/0190934 A1 * | 8/2006 | Kielstra | G06F 9/45516 717/148 |
| 2007/0079294 A1 | 4/2007 | Knight | |
| 2007/0294671 A1 * | 12/2007 | Demetriou | G06F 11/3664 717/124 |
| 2008/0225049 A1 * | 9/2008 | Fowler | G06T 15/40 345/422 |
| 2009/0037887 A1 | 2/2009 | Chavan | |
| 2009/0141034 A1 * | 6/2009 | Pryor | G06F 9/5044 345/522 |
| 2012/0167057 A1 | 6/2012 | Schmich | |
| 2012/0272224 A1 * | 10/2012 | Brackman | G06F 8/54 717/151 |
| 2013/0036409 A1 * | 2/2013 | Auerbach | G06F 8/456 717/140 |
| 2013/0091494 A1 * | 4/2013 | Sowerby | G06F 11/3624 717/129 |
| 2013/0125096 A1 * | 5/2013 | Kruetzfeldt | G06F 11/3624 717/130 |
| 2013/0173894 A1 * | 7/2013 | Yan | G06F 12/1072 712/228 |
| 2013/0300752 A1 | 11/2013 | Grover | |
| 2014/0146062 A1 * | 5/2014 | Kiel | G06F 11/362 345/522 |
| 2014/0310695 A1 * | 10/2014 | Martin | G06F 8/41 717/140 |
| 2016/0124728 A1 | 5/2016 | Mahaffey | |
| 2016/0188352 A1 * | 6/2016 | Marathe | G06F 8/41 717/145 |
| 2017/0344349 A1 | 11/2017 | He | |
| 2018/0165182 A1 | 6/2018 | Yoshida | |
| 2018/0189040 A1 | 7/2018 | Sasanka | |
| 2019/0139183 A1 * | 5/2019 | Goldman | G06F 11/3624 |
| 2019/0171538 A1 * | 6/2019 | Gulati | G01R 31/317 |

OTHER PUBLICATIONS

Eriksson et al., "Profiling and Tracing Tools for Performance Analysis of Large Scale Applications" (Year: 2016).*
Yang et al., "CPU-Assisted GPGPU on Fused CPU-GPU Architectures" (Year: 2011).*
Chung et al., "Compiler Technology" (Year: 2016).*
U.S. Non-Final Office Action issued in U.S. Appl. No. 16/154,542 dated Dec. 10, 2019.
U.S. Final Office Action issued in U.S. Appl. No. 16/154,542 dated Jun. 15, 2020.
Dietrich et al. "Phase-Based Profiling in GPGPU Kernels" (2012).
Rotariu et al. High-Level GPU Multi-Purpose Profiler (2013).
Stephenson et al. Flexible Software Profiling og CPU Architectures (2015).
Bourgoin et al. Profiling High Level Heterogeneous Programs Using the SPOC GPGPU framework for OCaml (2017).
Profile-Guided Optimizations Overview; User and Reference Guide for the Intel C++ Compiler 15.0; Aug. 18, 2015; 4 pages.

* cited by examiner

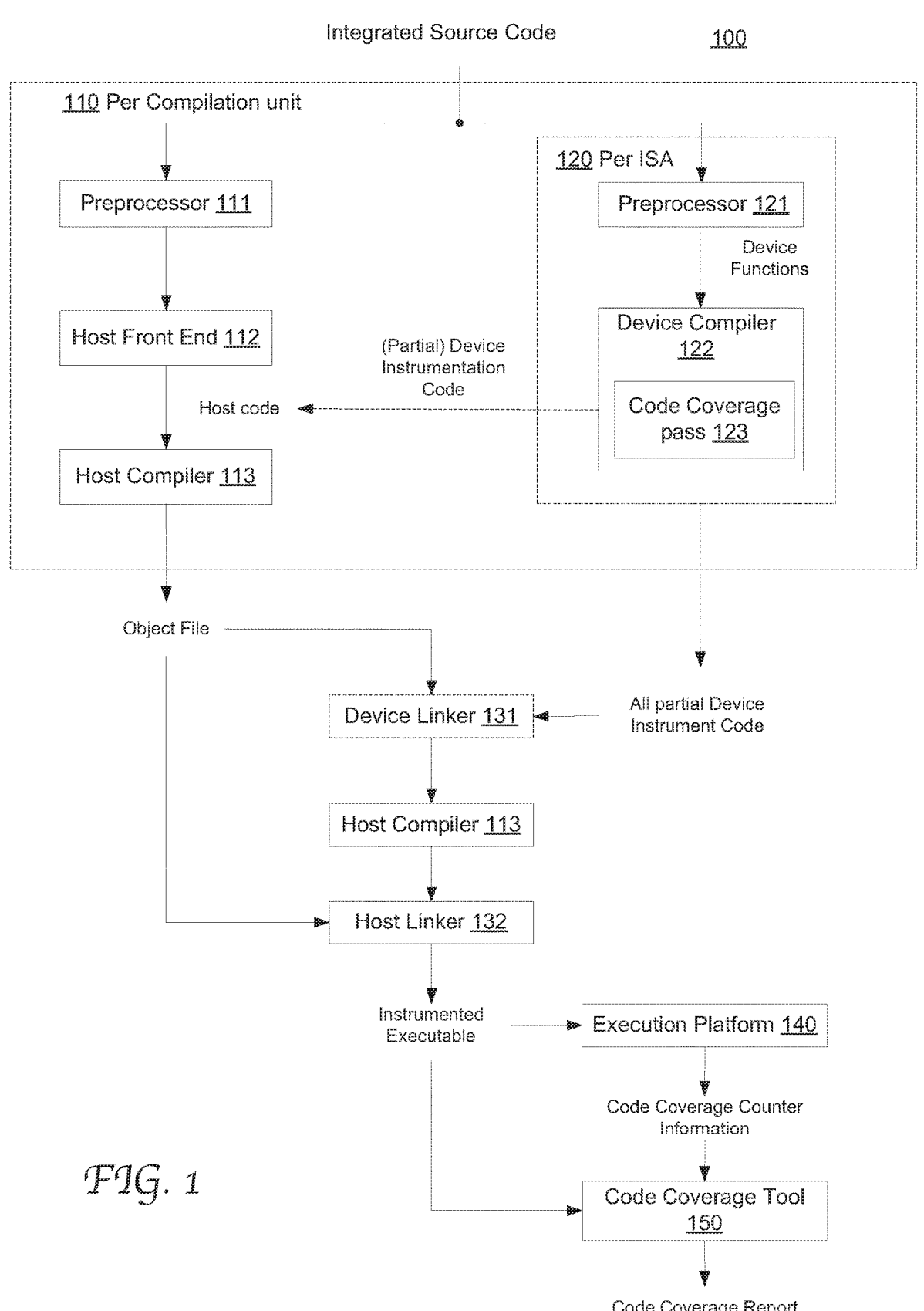

Integrated Source Code                    100

110 Per Compilation unit

Preprocessor 111

Host Front End 112

120 Per ISA

Preprocessor 121

Device Functions

Device Compiler 122

Code Coverage pass 123

(Partial) Device Instrumentation Code

Host code

Host Compiler 113

Object File

Device Linker 131

All partial Device Instrument Code

Host Compiler 113

Host Linker 132

Instrumented Executable

Execution Platform 140

Code Coverage Counter Information

Code Coverage Tool 150

Code Coverage Report

```
Converting function calls to coverage intrinsic instructions
              with instrumentation code 251
```

↓

```
Collecting memory usage requirements for each function
and emitting the information in the "covinfo" file with call
               graph information 252
```

↓

```
Accumulating the coverage mapping information for each
function and emitting a global constant variable for the
            whole compilation unit 253
```

*FIG. 2B*

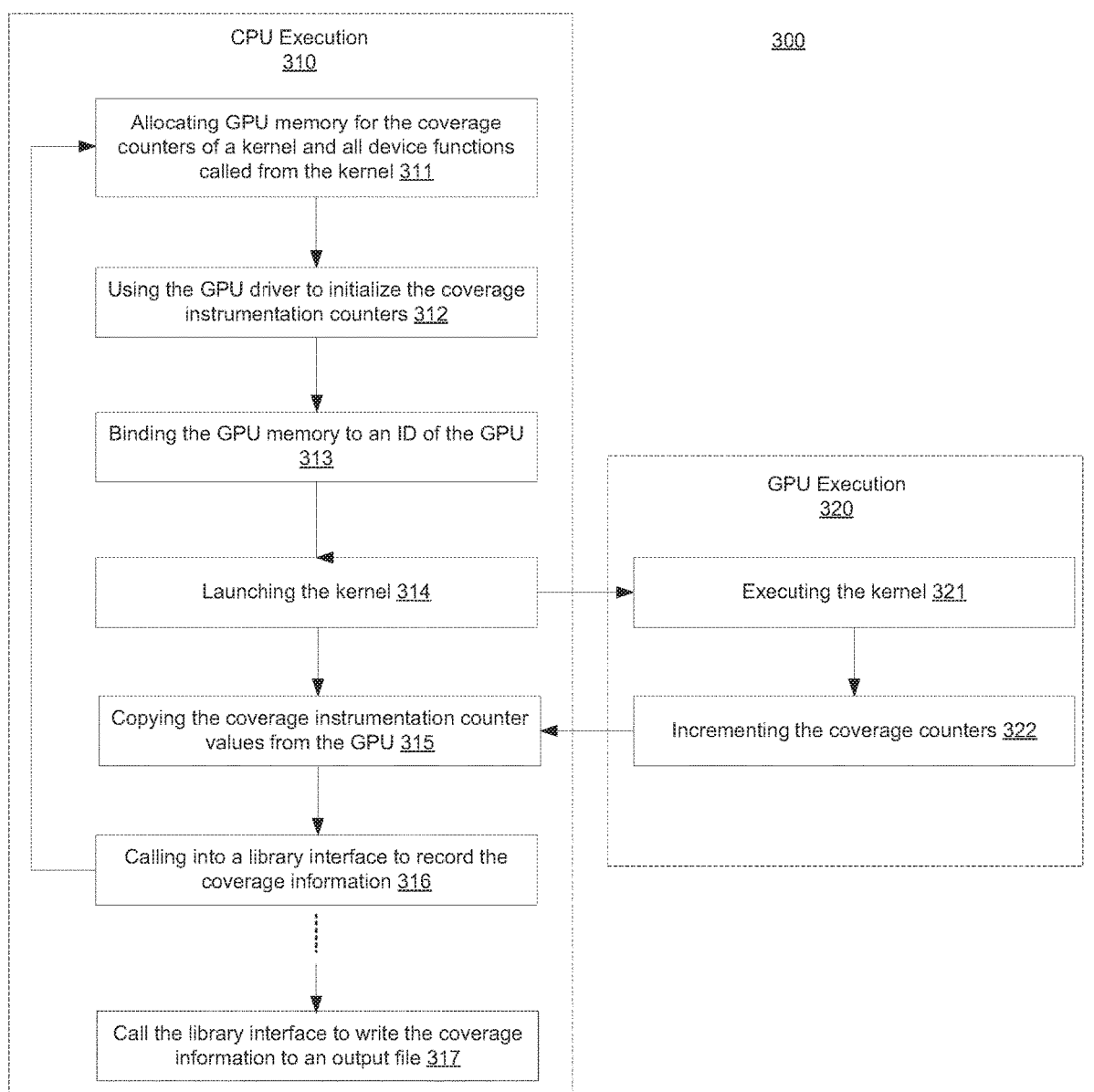

CPU Execution
310

300

Allocating GPU memory for the coverage counters of a kernel and all device functions called from the kernel 311

Using the GPU driver to initialize the coverage instrumentation counters 312

Binding the GPU memory to an ID of the GPU 313

GPU Execution
320

Launching the kernel 314

Executing the kernel 321

Copying the coverage instrumentation counter values from the GPU 315

Incrementing the coverage counters 322

Calling into a library interface to record the coverage information 316

Call the library interface to write the coverage information to an output file 317

Integrated Compiler 408

Code Coverage Pass 410

Application Software 407

Operating System 406

CPU 401    Memory 402    GPU 403    I/O interfaces 404    Network Circuits 405

CODE COVERAGE GENERATION THROUGH HOST-DEVICE COORDINATION

CROSS REFERENCE TO RELATED PATENT APPLICATIONS

This application claims priority to, and benefit of, U.S. patent application Ser. No. 16/154,542 (U.S. Patent Publication No. 2019/0108006), filed on Oct. 8, 2018, and entitled "CODE COVERAGE GENERATION IN GPU BY USING HOST-DEVICE COORDINATION," the content of which is herein incorporated by reference in entirety for all purposes, and which claims priority to U.S. provisional patent application No. 62/569,380, filed on Oct. 6, 2017, and entitled "COORDINATED HOST DEVICE MECHANISM FOR DEVICE PROFILING IN GPU ACCELERATORS AND CODE COVERAGE IN GPU ACCELERATORS FOR WHOLE PROGRAM AND SEPARATE COMPILATION," the content of which is herein incorporated by reference in entirety for all purposes.

FIELD OF THE INVENTION

Embodiments of the present disclosure are related to computer program compilers, and more specifically, to determining code coverage for software to be performed by one or more co-processors by coordinating with one or more host processors.

BACKGROUND OF THE INVENTION

Certain computer systems include a co-processing subsystem that may be configured to concurrently execute multiple program threads that are instantiated from a common application program. Such a computer system may include a host processor and one or more device processors which are also known as coprocessors or accelerator processors. For example, CUDA is a well-known parallel computing platform and an application programming interface (API) model that enables general purpose computing by using a graphics processing unit (GPU) as a device processor (or co-processor) and a Central Processing Unit (CPU) as a host processor. Code coverage is mechanism used to measure the degree to which source code is executed by a test-suite. It is often used to assist performance tuning by helping programmers focus their development and debug efforts on the most commonly executed portions of code. Current compiler techniques are not able to provide coverage information of code intended to be performed by co-processors, such as a graphics processing unit (GPU) or other fixed-function accelerator due, in part, to the difficulty in coordinating between a host processor (e.g., CPU) and a co-processor (e.g., GPU) when instrumenting code to be performed by the co-processor. Accordingly, there is currently a need for techniques to collect coverage information of code to be performed by a co-processor, such as a GPU or other accelerator.

BRIEF DESCRIPTION OF THE DRAWINGS

Embodiments are illustrated by way of example, and not by way of limitation, in the figures of the accompanying drawings.

FIG. 1 illustrates an exemplary computer implemented process of compilation and instrumented execution to generate code coverage information from device code execution in accordance with an embodiment of the present disclosure.

FIG. 2B is a flow chart depicting an exemplary computer implemented process of instrumenting device functions in a device compiler in accordance with an embodiment of the present disclosure.

FIG. 3 is a flow chart depicting an exemplary instrumented execution process through coordination between a CPU and a GPU in accordance with an embodiment of the present disclosure.

DETAILED DESCRIPTION OF THE INVENTION

Figure 2A:
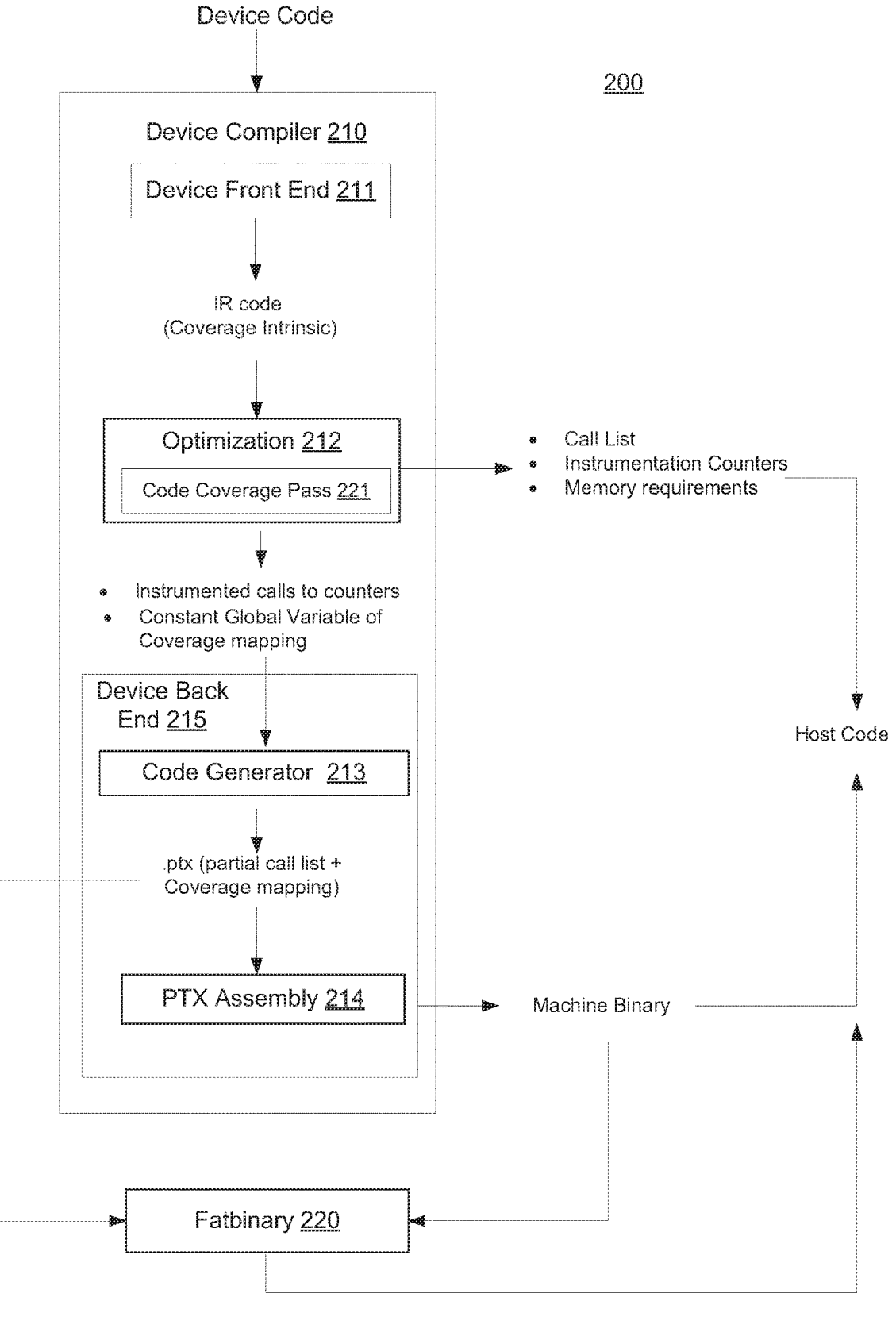
FIG. 2A illustrates an exemplary computer implemented process of instrumented compilation in a device compiler in accordance with an embodiment of the present disclosure.

Reference will now be made in detail to the preferred embodiments of the present disclosure, examples of which are illustrated in the accompanying drawings. While the disclosure will be described in conjunction with the preferred embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of embodiments of the present disclosure, numerous specific details are set forth in order to provide a thorough understanding of the present disclosure. However, it will be recognized by one of ordinary skill in the art that the present disclosure may be practiced without these specific details. In other instances, well-known methods, procedures, components, and circuits have not been described in detail as not to unnecessarily obscure aspects of the embodiments of the present disclosure.

NOTATION AND NOMENCLATURE

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "processing" or "compiling" or "linking" or "accessing" or "performing" or "executing" or "providing" or the like, refer to the action and processes of an integrated circuit, or similar electronic computing device, that manipulates and transforms data represented as physical (electronic) quantities within the computer system's registers and memories into other data similarly represented as physical quantities within the computer system memories or registers or other such information storage, transmission or display devices.

Code Coverage Generation in GPU by Using Host-Device Coordination

Embodiments of the present disclosure provide a compilation mechanism to enable generation of code coverage information with regard to code execution by a device processor (or a co-processor or accelerator processor herein). An exemplary integrated compiler can compile source code programmed to be concurrently executed by a host processor (or main processor) and a device processor. The compilation can generate an instrumented executable code including (1) code coverage instrumentation counters for the device functions, (2) mapping information that maps instrumentation counters to source constructs, (3) memory requirements of the counters, and (4) instructions for the host processor to allocate and initialize device memory for the counters and to retrieve collected coverage data from the device memory to generate instrumentation output. Execution of the instrumented executable code can produce values coverage counters, which when provided to coverage tool, along with the executable can produce code coverage report on the device functions.

The code coverage information can be used to determine the extent that the source code is expressed by a test-suite of test applications.

In one embodiment, a first processor, such as a GPU operates, as a co-processor of a second processor, such as a CPU, or vice versa. The first processor and the second professor are configured to operate in a co-processing manner.

Some embodiments of the present disclosure can be integrated in a NVCC compiler for the CUDA programming language and a General-Purpose computing on Graphics Processing Units (GPGPU) platform, e.g., with a CPU being the host and a GPU being a device. However, other embodiments of the present disclosure may also be used in any other suitable parallel computing platform that includes different types of processors.

For example, an application program written for CUDA may include sequential C language programming statements, and calls to a specialized application programming interface (API) used for configuring and managing parallel execution of program threads. A function associated with a CUDA application program that is destined for concurrent execution on a device processor is referred to as a "kernel" function. An instance of a kernel function is referred to as a thread, and a set of concurrently executing threads may be organized as a thread block.

FIG. 1 illustrates an exemplary computer implemented process 100 of compilation and instrumented execution to generate code coverage information from device code execution in accordance with an embodiment of the present disclosure. In one embodiment, the compilation process may be performed by an exemplary compiler that integrates the functionalities of host compilation by using a host compiler 113, device compilation by using a device compiler 122, and linking.

More specifically, the integrated source code is processed by the host and device preprocessors 111 and 112. The device code and the host code are separated from each other and supplied to the host compiler 113 and the device compiler 122, respectively. In the device compiler 122, the device code is subject to front end and back end processing to generate device code machine binary. In the illustrated embodiment, a code coverage pass 123 is implemented to generate instrumentation code by inserting code to increment counters to the device functions, e.g., as part of the optimization phase. As described in greater detail with reference to FIGS. 2A-3, in one embodiment, the code coverage pass 123 also generates mapping information that maps the inserted instrumentation counters to their source constructs (e.g., the source construct information is generated as part of the front end processing), and memory usage requirement for each device function. In one embodiment, the mapping information is passed along in the device binary, while the memory usage information and the call graph information are enclosed in a file named "covinfo."

The device compiler 122 sends the instrumentation code and the "covinfo" file to the host compiler 113 which uses the enclosed information to declare mirrors for counters on the host side. The device instrumented code is combined with the front end-processed host code and processed by the host compiler 113 to generate an object file. Provided with the device instrument code and the "covinfo" file, the host compiler 113 can generate instructions for a host processor to allocate and initialize memory for the counters in the instrumented execution phase, as described in greater detail below with reference to FIG. 3. The object file is then processed by the device linker 131 (in case of separate compilation as described below), the host compiler 113, and the host linker 132. As a result, the instrumented executable code is produced for the program.

After the execution platform 140 executes the executable, it produces code coverage data including counter information, which when combined with coverage information available in the executable, is passed to a code coverage tool. A code coverage report with collected code coverage data can be produced by the coverage tool 150, e.g., in a format that can be displayed in a graphics user interface (GUI) viewable by a user. In one embodiment, the report may present the source file as annotated with coverage information at source block granularity, and annotated uncovered source region. In one embodiment, the device compiler 122 may be configured to limit instrumentation and annotation to a selected set of functions in the program.

In one embodiment, the flow in the dashed-line box 120 may be performed for each virtual architecture, e.g., each Instruction Set Architecture (ISA). In one embodiment, an architecture field is added to the host-device communication macros to uniquely identify the different architecture variants.

In case of whole compilation, in one embodiment, the flow in the dashed-line box 110 is performed once as the device instrument code supplied to the host compiler includes a complete function call list (callee list) of each kernel. In case of separate compilation, in one embodiment, a complete function call list of a kernel may not be known at the time of compiling the kernel by the device compiler 122. The call graph and the callee list may be only available at link time. In one embodiment, communications between the device compiler 122, the device linker 131 and the host compiler 113 are used to achieve instrumentation. Partial instrument information from all compilation units is fed to the device linker 131 and combined with the object file. As such, the instrumentation for the entire program, and therefore for a complete function call list, becomes available.

More specifically, for each compilation unit configured to compile a portion of the source code, the flow in the dashed-line box 110 is performed once and the code coverage pass 123 may generate instrumentation related to a partial function call list contained in the portion. During compilation, the device compiler 122 instruments the portion of the code as it would for a whole program compilation. In addition, it emits information of instrumentation counters and mapping in "covinfo" to the host compiler 113 for it to declare mirrors for the counters.

In one embodiment, an initialized constant variable may be created, containing:

1. Function name, function hash, architecture ID and number of counters for each device function; and 2. Partial call list containing calls recognized for one compilation unit.

In one embodiment, at link time, the instrument information from all compilation units is collated and a call graph is generated which contains the partial call graphs using compiler information. This call graph is supplemented with the call graph generated by the linker 131, and instrument code is generated using the combined call list. In one embodiment, this instrument code contains all the information necessary for the host side to allocate memory and print the collected coverage data to a file after a kernel launch. In one embodiment, a host side stub file is created, compiled and linked to produce the final executable.

In one embodiment, function names may be passed between the device compiler 122 and the linker 131 using relocations. The device compiler 122 uses function addresses in the counter variable initialization. They turn into linker relocations, which are patched at link time. In another embodiment, function names can be passed as strings.

As the coverage information collected for a program is sensitive to changes to the compiler and the source code, in one embodiment, a Cyclic Redundancy Check (CRC) error detection code can be used to check based on the structure and indexes of the CFG of the program. The CRC code in combination with the function names can be used to facilitate validity verification of the code coverage data.

According to embodiments of the present disclosure, coverage instrumentation for device code includes two major tasks: (1) instrumenting the source code with increment counters; and (2) generating coverage mapping information to map instrumentation counters to source constructs. Task (1) uses call graph information and full instrumentation information for each function. Thus, in one embodiment, it may be achieved by using an optimization (OPT) module pass. In one embodiment, task (2) may be achieved by a front end process with its access to source lexical blocks. In one embodiment, as part of parsing, the front end of the device compiler constructs a syntax tree, along with the source line information, e.g., Source Position (SPOS).

FIG. 2A illustrates an exemplary computer implemented process 200 of instrumented compilation in an exemplary device compiler 210 in accordance with an embodiment of the present disclosure. In the illustrated example, the device front end 211 is configured to generate and emit calls to coverage intrinsics at instrumentation points as part of intermediate representation (IR) code generation. At this stage, the lexical blocks and their source positions are available. The intrinsics are operable to encode the source positional information as parameters and may be emitted for each lexical block in the source program.

In one embodiment, the optimization phase (OPT) 212 includes a code coverage module pass 221 operable to convert the coverage intrinsics to coverage instrumentation instructions in the instrumentation code and emit relevant information in a file (e.g., in the "covinfo") which can be used by the host compiler to generate instructions for a host processor to allocate memory during execution. In addition, the code coverage pass 221 also converts the coverage intrinsics to coverage mapping information and emits this information in the assembly language code (e.g., PTX code) and the machine binary code (e.g., "cubin") for example. In one embodiment, a global coverage mapping variable may be emitted for each compilation unit in case of separate compilation. In one embodiment, the information in all such variables from different compilation units is then combined together by the linker.

The coverage mapping information can be used in reconstruction of the collected coverage data into a coverage report, which needs the values of all the counters emitted for a compilation unit, and the mapping of source positions to the corresponding counters. In some embodiments, for reconstruction, an extract library may be implemented to enable a coverage tool to retrieve the mapping information. Since the machine binary code (e.g., "cubin") is wrapped in fat binary in the host-side executable, the library can operate to unpack all the machine binary and append the coverage information for the coverage tool. This information is then analyzed along with the instrumentation counter values read from the library calls to construct the coverage report.

As illustrated, the device compiler 210 emits a list of information to the host side for combination with the front end processed host code, the information including the constant global variable of call list or partial call lists in case of separate compilation, instrumentation counters, and the memory requirements of the counters.

The output from the optimization phase 212, including the instrumented calls to counters and coverage mapping information, is sent to the back end 215, where the device code generator 213 converts it into assembly language code (e.g., PTX). The PTX code is further converted to machine binary code by the PTX assembly 214. In one embodiment, the PTX code and machine binary code are embedded in the fat binary through the fat binary module 220 and also combined ("included") in the front end-processed host code which is fed to the host compiler.

In this example, the code coverage pass is a module pass integrated as part of an Intermediate Representation (IR) pass in the device optimization phase, and can be invoked anywhere in the optimization phase 212 of the device back end 215 before conversion of the IR code to the machine instruction code. However, it will be appreciated that the device code coverage generation can be implemented in any other well-known suitable manner without departing from the scope of the present disclosure.

FIG. 2B is a flow chart depicting an exemplary computer implemented process 250 of instrumenting device functions in a device compiler in accordance with an embodiment of the present disclosure. Process 250 can be implemented in a module pass as call graph information is needed. In one embodiment, process 250 may be performed by the code coverage pass 221 in FIG. 2A. At 250, for each device function, the calls to coverage intrinsics are converted to instrumentation instructions in the instrumentation code. At 252, the memory usage requirement for each function is collected and this information is emitted in the "covinfo" file with call graph information. At 253, the coverage mapping information for each function is accumulated, and a global constant variable for the whole compilation unit is emitted.

In one embodiment, a code coverage pass is used to generate device instrumentation code by inserting instrumentation counters. The counters are updated each time the associated code is executed. Also generated in compilation are the instructions for coordination between the host processor and the device processor during the instrumented execution, such as memory allocation and initialization. FIG. 3 is a flow chart depicting an exemplary instrumented execution process 300 through coordination between a CPU and a GPU in accordance with an embodiment of the present disclosure.

The flows in the dashed-boxes 310 and 320 illustrate the CPU (host) execution and GPU (device) execution processes, respectively. Steps 311-317 and 321-322 are performed for each kernel invocation at runtime. At 311, the CPU allocates GPU memory for the coverage instrumentation counters of a kernel and all the device functions called from the kernel. At 312, the GPU driver is used to initialize the coverage instrumentation counters. At 313, the GPU memory is bound to an ID of the GPU, e.g., a device symbol name. At 314, the CPU launches the kernel.

In response, the GPU executes the kernel at 321 and increments the coverage instrumentation counters accordingly at 322. The counters associated with a respective code portion are updated each time the respective code portion is executed at 321. In one embodiment, atomic instructions (e.g., PTX instructions) are used to achieve atomic update operations.

At 315, the CPU copies the counter values from the GPU memory, and at 316 calls into a library interface to record the collected coverage data including the counter values. When the execution exits, at 317, the CPU calls a library to write the collected coverage data to an output file.

Figure 4:
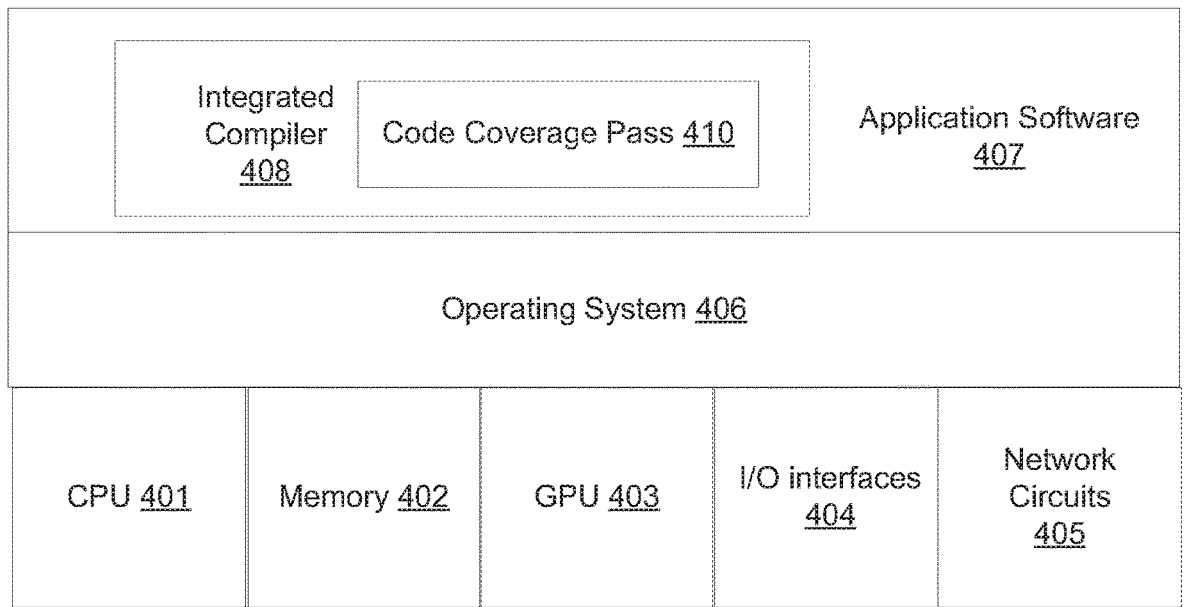
FIG. 4 is a block diagram illustrating an exemplary computing system operable to compile integrated source code and instrument the code for code coverage data collection in accordance with an embodiment of the present disclosure.

FIG. 4 is a block diagram illustrating an exemplary computing system 400 operable to compile integrated source code and instrument the code for code coverage data collection in accordance with an embodiment of the present disclosure. In one embodiment, system 400 may be a general-purpose computing device used to compile a program configured to be executed concurrently by a host processor and one or more device processors in parallel execution system. System 400 comprises a Central Processing Unit (CPU) 401, a system memory 402, a Graphics Processing Unit (GPU) 403, I/O interfaces 404 and network circuits 405, an operating system 406 and application software 407 stored in the memory 402. In one embodiment, software 407 includes an exemplary integrated compiler 408 configured to compile source code of programs having a mixture of host code and device code.

In one embodiment, provided with source code of a program and executed by the CPU 401, a code coverage pass 410 in the integrated compiler 408 can generate instrumented executable code with coverage instrumentation counters inserted for the device functions, coverage mapping information and memory requirement for the counters. The compiler 408 can further generate instructions for the host processor to allocate and initialize device memory for the counters and to retrieve collected coverage information from the device memory and output coverage counters. The compiler 408 may perform various other functions that are well known in the art as well as those discussed in details with reference to FIGS. 1-3.

What is claimed is:

1. One or more processors, comprising:
circuitry to:
generate code comprising instrumentation to cause a host processor to initialize device memory to store one or more counters to indicate a number of times code is performed by a device processor, wherein the host processor and the device processor have different architectures;
store, in device code, mapping information indicative of a mapping between the counters and source code constructs; and
generate code coverage information based, at least in part, on the counters and the mapping information.

2. The one or more processors of claim 1, wherein the circuitry is further to utilize a linker to generate an instrumented version of executable code from the code compiled to be performed by the host processor and the code compiled to be performed by the device processor.

3. The one or more processors of claim 2, wherein the circuitry comprises a processor and a co-processor, the instrumented version of executable code operable to cause the processor to allocate co-processor memory for instrumentation counters.

4. The one or more processors of claim 3, wherein the instrumented version of executable code is operable to cause the processor to use a driver for the co-processor to initialize the co-processor memory.

5. The one or more processors of claim 3, wherein the instrumented version of executable code operable to cause the processor to invoke a kernel for execution and to cause the co-processor to update one or more instrumentation counters during execution of the kernel.

6. The one or more processors of claim 1, wherein the circuitry further comprises a device compiler to compile a first part of the code and comprises a host compiler to compile a second part of the code.

7. The one or more processors of claim 1, wherein the circuitry further comprises a device compiler to transmit, to a host compiler, information for instrumentation counters and mapping information to associate the instrumentation counters to source constructs.

8. The one or more processors of claim 1, wherein the circuitry is further to cause a compiler to generate instructions for a host processor, the instructions to cause the host processor to allocate and to initialize device memory for instrumentation counters.

9. The one or more processors of claim 8, wherein the compiler is operable to retrieve collected coverage information from the device memory and output coverage counters.

10. The one or more processors of claim 1, wherein the circuitry comprises a Central Processing Unit (CPU) and a Graphics Processing Unit (GPU).

11. A system comprising:
one or more processors to:
generate code comprising instrumentation to cause a host processor to initialize device memory to store one or more counters to indicate a number of times code is performed by a device processor, wherein the host processor and device processor have different architectures;
store, in device code, mapping information indicative of a mapping between the counters and source code constructs; and
generate code coverage information based, at least in part, on the counters and the mapping information; and one or more memory devices to store the code compiled to be performed by the host processor and the code to be performed by the device processor.

12. The system of claim 11, wherein the one or more processors are further to generate coverage mapping information indicative of correspondence between at least one instrumentation counter and source constructs of instrumented points of source code.

13. The system of claim 11, wherein the one or more processors are further to convert calls to coverage intrinsics that are associated with the device processor to coverage instrumentation code.

14. The system of claim 13, wherein the calls to coverage intrinsics are operable to encode source constructs of instrumented points of source code into parameters.

15. The system of claim 13, wherein instrumented device code is operable to cause the host processor to allocate memory in the device processor.

16. A method, comprising:
generating code comprising instrumentation to cause a host processor to initialize device memory to store one or more counters to indicate a number of times code is performed by a device processor, wherein the host processor and device processor have different architectures;
storing, in device code, mapping information indicative of a mapping between the counters and source code constructs; and
generating code coverage information based, at least in part, on the counters and the mapping information.

17. The method of claim 16, further comprising:
generating, by a linker, an instrumented version of executable code from the code compiled for a second processor.

18. The method of claim 16, further comprising:
allocating, by the host processor executing an instrumented version of executable code, memory of the device processor to store one or more instrumentation counters associated with the code compiled for the device processor.

19. The method of claim 18, further comprising:
causing, by the instrumented version of executable code, the host processor to use a driver for the device processor to initialize the memory of the device processor.

20. The method of claim 18, further comprising:
causing, by the instrumented version of executable code, the host processor to invoke a kernel for execution and the device second processor to update the one or more instrumentation counters during execution of the kernel.

21. The method of claim 16, further comprising: enabling, by a device compiler, a first part of the code to be compiled; and enabling, by a host compiler, a second part of the code to be compiled.

22. The method of claim 16, further comprising: transmitting, from a device compiler to a host compiler, information for one or more instrumentation counters associated with an instrumented version of object code and mapping information to associate the one or more instrumentation counters to source constructs.

23. The method of claim 16, further comprising: generating instructions for the host processor to allocate and initialize device memory for one or more instrumentation counters.

24. The method of claim 23, further comprising retrieving collected coverage information from the device memory and output coverage counters.

25. The method of claim 16, wherein the host processor comprises a central processing unit and the device processor comprises a graphics processing unit.

* * * * *